July 27, 1965  M. J. DI TORO  3,196,678

AVERAGING WEATHER VANE

Filed July 20, 1962

United States Patent Office 3,196,678
Patented July 27, 1965

3,196,678
AVERAGING WEATHER VANE
Michael J. Di Toro, Massapequa, N.Y., assignor to Cardion Electronics, Inc., a corporation of Delaware
Filed July 20, 1962, Ser. No. 211,327
4 Claims. (Cl. 73—188)

This invention relates to weather vanes and, more particularly, to such vanes by which there may be determined a running average of wind direction over a desired interval.

The presently available weather vanes exhibit a pronounced torsional mechanical resonance in rotation about their axes. This resonance is produced by the interplay of the moment of inertia of the vane and the aerodynamic torsional restoring stiffness of the wind. In the presence of a mixture of a wind from a steady direction and gusts of wind from other random directions, vanes of the type currently in use tend to oscillate about the steady wind direction, which precludes accurate measurement. Experience has shown that what is important is not fast weather vane readings but a running average of wind direction, wherein the averaging time is of the order of 5 to 10 seconds to as much as 1 minute. Such a statistical running average tends to smooth out the disturbing wind gusts from random directions.

The effects of such random gusts on a weather vane can be minimized by incorporating in the design of the weather vane a mechanism for achieving a torsional and nonfriction damping of the resonance between the moment of inertia of the vane and its aerodynamic torsional restoring stiffness or for achieving the statistical process of giving a running average of wind direction over an interval of time of 5 to 10 seconds or more, or both.

It is an object of the invention therefore, to provide a new and improved weather vane in which the resonance characteristics of the vane are substantially damped out.

It is another object of the invention to provide a new and improved weather vane giving an indication which is a running average of wind direction over a predetermined time interval.

In accordance with the invention, there is provided a weather vane comprising a wind-deflectable rotatable vane having a predetermined moment of inertia and a predetermined aerodynamic stiffness and which for usual wind velocities is subject to resonant oscillation at a frequency independent of the frequency of wind direction fluctuations precluding the accurate determination of wind direction, a nonfriction damping apparatus including a stationary element and an element secured to the vane and having a damping constant proportioned to damp resonant oscillation of the vane beyond the critical value for wind velocity of a given value, and means coupled to the vane for determining wind direction.

For a better understanding of the present invention, together with other and further objects thereof, reference is had to the following description taken in connection with the accompanying drawing, while its scope will be pointed out in the appended claims.

Referring now to the drawing:

FIG. 2 is a graph illustrating certain operating characteristics of the apparatus of FIG. 1, while

Figure 1:
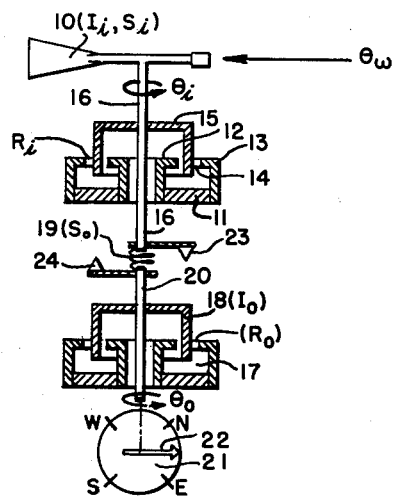
FIG. 1 is a diagram representing an averaging weather vane embodying the invention.

Referring now to FIG. 1 of the drawing, there is represented a weather vane comprising a wind-deflectable rotatable vane 10 having a predetermined moment of inertia $I_1$ which, for usual wind velocities, is subject to resonant oscillation at a frequency precluding the accurate determination of wind direction. This resonant oscillation is, as mentioned above, due to the torsional stiffness $S_1$ of the wind, which varies approximately as the square of the wind velocity. The weather vane further comprises a non-friction damping apparatus, such as an eddy-current damping apparatus, including a stationary element and an element coupled to the vane. The stationary element may be the magnetic element of the damping apparatus and include an annular permanent magnet portion 11 having inner and outer annular soft magnetic pole pieces 12 and 13 forming an annular air gap 14. The eddy-current brake includes a rotatable conductive element 15, for example in the form of a copper cup-like element, extending into the air gap 14 and coupled to the vane 10 as by mounting on a common shaft 16. The damping parameter of this mechanism is indicated as $R_1$.

The weather vane of the invention further comprises a nonfriction damped mechanical resonant system including an element coupled to the vane and an output element rotatable relative thereto. Specifically, this system includes a second eddy-current damping apparatus comprising a stationary magnetic element 17 which may be similar in construction to the magnetic element 11, 12, 13, 14. This second damping apparatus further includes a rotatable element, such as a copper cup 18, extending into the air gap of the magnetic element 17. This resonant system includes a torsional spring 19 interconnecting the rotatable element 18 mounted on a shaft 20 and the shaft 16 of the vane 10, thereby forming a nonfriction damped mechanical resonant system. The spring 19 has a spring constant $S_0$ proportioned relative to the moment of inertia $I_0$ of the rotatable element 18 to provide a mechanical time constant of the order of the desired time of averaging the wind direction. The eddy-current damping apparatus 17, 18 has a damping parameter $R_0$.

The weather vane of the invention further comprises means coupled to the vane 10 through the mechanical resonant system 17, 18, 19 for determining wind direction, specifically a compass chart 21 and an associated indicator 22 registering therewith and mounted on the shaft 20, as schematically indicated. Cooperating stops 23 and 24, mounted respectively on shafts 16 and 20, limit relative rotation of these shafts to approximately 360°.

Figure 2:
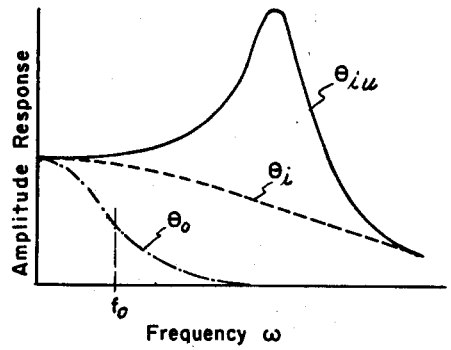

For an explanation of the operation of the weather vane described, reference is made to FIG. 2 of the drawing, representing certain operating characteristics of the apparatus of FIG. 1. In this figure, the ordinates represent the relative amplitude of response of certain elements of the oscillating system while the abscissae represent the frequency of the fluctuating component of wind direction. In this graph, Curve $\theta_{1u}$ represents the resonance characteristics of the vane 10 if it were completely undamped, this curve corresponding to a given wind velocity. A series of similar curves will represent the resonant responses of the vane at other wind velocities. It is seen that this curve exhibits a marked mechanical resonance and physically would represent a violent oscillation of the indicator 22 over the compass chart 21 so that any accurate measurement of wind direction would be impossible.

The effect of the eddy-current damping apparatus 11–15, inclusive, is to damp the oscillations of the vane beyond the critical value so that the response of the vane is represented by the Curve $\theta_1$. The effect of this damping is substantially to reduce the amplitude of the oscillations of the vane 10 in the vicinity of its natural resonance. However, the aerodynamic stiffness $S_1$, varying with the square of the wind velocity, varies over such a wide range as to require a damping parameter $R_1$ which would be inadequate for high wind velocities and excessive at low wind velocities, causing the mechanism to be sluggish in its response.

Therefore, in accordance with a preferred embodiment of the invention, the weather vane includes an additional damped resonant mechanism in cascade with the input resonant system 10–15, inclusive, to permit averaging of the wind direction over a definite interval.

The damped mechanical resonant system comprising the torsional spring 19 and the damping mechanism 17, 18 is effective to develop a running average of the wind direction over a finite interval of time, depending upon the mechanical time constant of this mechanism, which may be of the order of from 5 to 10 seconds up to as much as a minute or more.

Referring again to FIG. 2, Curve $\theta_0$ represents the response of the output shaft 20 and indicator 22 to an input represented by the Curve $\theta_1$, which represents the movement of the vane 10 and its shaft 16. The resonant frequency $f_0$ of the mechanical system including both the resonant system of the vane and the resonant system 17, 18, 19, is made about equal to the reciprocal of twice the averaging time. The averaged nonoscillatory output wind direction $\theta_0$ is then indicated by the element 22 relative to the compass chart 21 or may be utilized to develop any analog mechanical or electrical quantity varying with the rotation of the shaft 20.

It can be shown that, near critical damping, desirable transient response and approximately uniform weighting of the averaging process on $\theta_1$ are achieved by the relation:

$$2\pi f_0 I_0 / R_0 = 0.6 \qquad (1)$$

However, the design parameters of the system can be selected to give a value to the ratio of Equation (1) much less than 0.6 which has the effect of commensurately increasing the averaging time but at the expense of nonuniform weighting of the averaging process.

Figure 3:
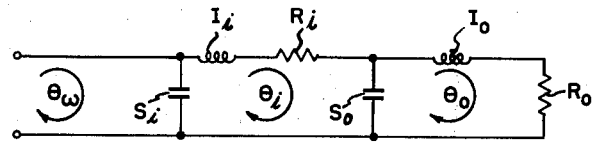
FIG. 3 is a diagram of an electrical circuit which is an analog of the mechanical system of FIG. 1.

To aid in the explanation of the operation of the apparatus of FIG. 1, there is illustrated in FIG. 3 the electrical analog of the mechanical resonant systems of FIG. 1 coupled in cascade, the circuit values of this electrical system being represented by their equivalent mechanical analogs applied to the apparatus of FIG. 1.

In certain applications of the invention, the damped mechanical resonant system comprising the elements 17–20, inclusive, alone may give adequate though not optimum performance, thus permitting the omission of the damping apparatus comprising elements 11–15, inclusive, and correspondingly simplifying and reducing the cost of the apparatus.

While there has been described what is, at present, considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A weather vane comprising: a wind-deflectable rotatable vane having a predetermined moment of inertia and a predetermined aerodynamic stiffness and which for usual wind velocities is subject to resonant oscillation at a frequency independent of the frequency of wind direction fluctuations precluding the accurate determination of wind direction; a nonfriction damping apparatus including a stationary element and an element secured to said vane and having a damping constant proportioned to damp resonant oscillation of said vane beyond the critical value for wind velocity of a given value; and means coupled to said vane for determining wind direction.

2. A weather vane comprising: a wind-deflectable rotatable vane having a predetermined moment of inertia which for usual wind velocities is subject to resonant oscillation at a frequency precluding the accurate determination of wind direction; an eddy-current damping apparatus including a stationary element and an element coupled to said vane; a second eddy-current damping apparatus including a stationary element and a rotatable element; a torsional spring interconnecting said rotatable element and said vane to form a nonfriction damped mechanical resonant system and having a spring constant proportioned relative to the moment of inertia of said rotatable element to provide a mechanical time constant of the order of desired time of averaging wind direction; and means coupled to said rotatable element for determining wind direction.

3. A weather vane comprising: a wind-deflectable rotatable vane having a predetermined moment of inertia and a predetermined aerodynamic stiffness and which for usual wind velocities is subject to resonant oscillation at a frequency independent of the frequency of wind direction fluctuations precluding the accurate determination of wind direction; an eddy-current damping apparatus including a stationary annular magnetic element having an annular air gap and including a permanent magnet portion and an annular conductive element disposed in said annular air gap and secured to said vane and having a damping constant proportioned to damp resonant oscillation of said vane beyond the critical value for wind velocity of a given value; and means coupled to said vane for determining wind direction.

4. A weather vane comprising: a wind-deflectable rotatable vane having a predetermined moment of inertia and a predetermined aerodynamic stiffness and which for usual wind velocities is subject to resonant oscillation at a frequency independent of the frequency of wind direction fluctuations precluding the accurate determination of wind direction; a nonfriction damping apparatus including a stationary element and an element secured to said vane and having a damping constant proportioned to damp resonant oscillation of said vane beyond the critical value for wind velocity of a given value; a second nonfriction damping apparatus including a stationary element and a rotatable element; a torsional spring interconnecting said rotatable element and said vane to form a nonfriction damped mechanical resonant system and having a spring constant proportioned relative to the moment of inertia of said rotatable element to provide a mechanical time constant of the order of desired time of averaging wind direction; and means coupled to said rotatable element for determining wind direction.

References Cited by the Examiner

UNITED STATES PATENTS

| | | | |
|---|---|---|---|
| 2,032,306 | 2/36 | Pratt | 73—430 |
| 2,315,185 | 3/43 | Boyles | 73—202 |
| 2,918,817 | 12/59 | Hughes et al. | 73—188 X |

LOUIS R. PRINCE, *Primary Examiner.*

JOSEPH P. STRIZAK, RICHARD QUEISSER,
*Examiners.*